(12) United States Patent
Wynne (10) Patent No.: US 12,012,740 B2
(45) Date of Patent: *Jun. 18, 2024

(54) LIQUID RUN-OFF DISPOSAL SYSTEM

(71) Applicant: Michael John Wynne, Woodlands (AU)

(72) Inventor: Michael John Wynne, Woodlands (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,901

(22) Filed: Mar. 24, 2023

(65) Prior Publication Data

US 2023/0295913 A1    Sep. 21, 2023

Related U.S. Application Data

(63) Continuation of application No. 17/364,733, filed on Jun. 30, 2021, now Pat. No. 11,643,800, which is a (Continued)

(30) Foreign Application Priority Data

Jun. 2, 2017    (AU) ................................ 2017902118

(51) Int. Cl.
*E03F 1/00*    (2006.01)
*E02B 11/00*   (2006.01)
*E03F 5/14*    (2006.01)

(52) U.S. Cl.
CPC .............. *E03F 1/003* (2013.01); *E02B 11/00* (2013.01); *E03F 5/14* (2013.01)

(58) Field of Classification Search
CPC ... E03F 1/00; E03F 1/002; E03F 1/003; E03F 1/005
(Continued)

(56) References Cited

U.S. PATENT DOCUMENTS 1,380,980 A    6/1921  Lane
1,972,991 A    9/1934  Hinkle
(Continued)

FOREIGN PATENT DOCUMENTS

WO    2007021715 A2    2/2007

*Primary Examiner* — Kyle Armstrong
(74) *Attorney, Agent, or Firm* — BROWDY AND NEIMARK, P.L.L.C.

(57) ABSTRACT

An improved liquid run-off disposal system is described having an infiltration chamber 72 with first and second sidewalls 74. In cross-sectional view the first and second sidewalls 74 each include an inner surface 76 and outer surface 78, and each sidewall 74 includes a plurality of integrated louvre-shaped apertures 80. In cross-sectional view each louvre-shaped aperture 80 includes an upper surface 82 and a lower surface 84 which are angled upwards from the outer surface 78 and protrude inwards from the inner surface 76 into the interior of the infiltration chamber 72. The upper and lower surfaces 82, 84 comprise a plurality of angled sections, the angled sections being arranged so as to form a substantially vertical flow path through a portion of the aperture 80. The angled sections of the upper and lower surfaces 82, 84 are arranged at an angle and of a length so as to substantially overlap when viewed in a horizontal direction. The overlapping region "$Y_1$" ensures that the apertures 80 will admit the exit of water but substantially inhibit the entry of soil wherein, in use, when liquid run-off is piped into the infiltration chamber 72 it can drain away through the apertures 80 and into the surrounding soil.

17 Claims, 10 Drawing Sheets

Related U.S. Application Data continuation of application No. 16/619,280, filed as application No. PCT/AU2018/050536 on May 31, 2018, now Pat. No. 11,142,899.

(58) Field of Classification Search
USPC .......................................... 405/43, 44, 46, 48
See application file for complete search history.

(56) References Cited

U.S. PATENT DOCUMENTS

| | | |
|---|---|---|
| 4,452,024 A | 6/1984 | Sterriker et al. |
| 4,759,661 A | 7/1988 | Nichols et al. |
| 6,270,287 B1 | 8/2001 | Gray |
| 7,207,747 B1 | 4/2007 | England |
| 9,809,968 B1 | 11/2017 | Holbrook et al. |
| 2016/0160487 A1 | 6/2016 | Wynne |

LIQUID RUN-OFF DISPOSAL SYSTEM

FIELD OF THE INVENTION

The present invention relates to an improved liquid run-off disposal system and relates particularly, though not exclusively, to such a disposal system for disposing of stormwater run-off and grey water effluent.

BACKGROUND TO THE INVENTION

In Perth, Western Australia, because of the generally sandy son, one of the most common methods for disposing of stormwater is to employ soakwells. A typical soakwell consists of a cylindrical section that is installed in a vertical orientation in the soil. It may have a plurality of apertures provided in the side wall, and it is open at the bottom to provide a maximum infiltration area, so that when water collects in the soakwell it can rapidly soak into the soil underneath. Downpipes connected to drains from roof guttering or road drains are plumbed into the side wall of the soakwell so that stormwater run-off is safely directed and disposed of away from building foundations and roadway surfaces. Soakwells may also collect rainwater run-off from car park areas.

Other types of infiltration devices/apparatus have been developed to provide liquid run-off disposal for various applications. An important factor in the design and installation of infiltration devices/apparatus relates to groundwater levels. For infiltration devices/apparatus to provide effective performance they need to have a measure of vertical separation for stormwater run-off or effluent to infiltrate into the soils below and then disperse into the groundwater table. The degree of separation can vary from location to location or Local Council to Local Council and can be as little as ≤0.5 metres or as high as ≥2.0 metres separation depending on the application such as rainwater or effluent grey water disposal.

Where there is a high groundwater table level the infiltration device/apparatus may not have the measure of separation required by engineering standards or policy levels such as Local, State or Federal Government levels (separation level nominated by law makers or Standards requirements or simply good design practices). Engineers may design for a level of separation, but there are instances where a storm event or higher than normal tides (tidal surges) may occur which raises the levels of ground water flow through the soils and the peak water levels may be greater or exceed the original design invert level (bottom) intent of the effluent storage/infiltration apparatus for short periods. Rising sea levels are also an issue.

Currently, the issue of ingress of soils in both water-affected and dry areas is mitigated by the use of Geosynthetic cloths wrapped around the external perimeter of the infiltration apparatus. The Geosynthetic material is designed to stop soils from entering after backfill and compaction, or suspended solids from the surrounding soil being carried in the groundwater back into the device/apparatus/chamber. Current devices/apparatus do not provide any protection against such groundwater backflow as the louvre design is ineffective to mitigate such backflow in its own right. However Geosynthetic cloths are proven to block-up over time from "fines" in the soils, which results in reduced infiltration from the apparatus into the surrounding soils and eventually renders the apparatus inoperable and not fit for purpose. Blocked Geosynthetic cloths cause the disposal system to retain effluent rather than infiltrate it into the soils, which in turn causes the system to back-up resulting in serious damage to property and surrounding locations.

U.S. Pat. No. 3,645,100 (La Monica) is an example of a prior art leaching chamber unit for a soil absorption system. La Monica describes a leaching chamber having a plurality of perforations molded into the sidewalls of the chamber through which effluent can flow from the interior of the chamber into the surrounding soil. FIG. 8 of La Monica shows a preferred form of upwardly angled wall perforation 15' wherein the lower edge 48 of the opening on the inside of the wall is higher than the upper edge 49 of the outer side of the opening to prevent the ingress of stone into the chamber interior. A problem with the perforations of La Monica is that the very small overlap of the lower edge 48 and upper edge 49 is insufficient to prevent the ingress of sand and other soil particles, particularly in the presence of groundwater. With this kind of system the use of Geosynthetic cloth is essential to inhibit backflow of soil into the interior of the leaching chamber.

Commonly-owned U.S. Pat. No. 9,290,964 discloses a liquid run-off disposal system comprising an elongate tank structure having one or more culvert sections adapted to be arranged end to end in a substantially horizontal orientation below ground. Each culvert section includes a plurality of apertures provided in the sidewalls thereof wherein, in use, when liquid run-off is piped into the tank structure it can drain away by soaking into the surrounding soil. In several embodiments the louvre-shaped apertures are provided in the form of louvre-shaped inserts, which may be mass-produced from injection moulded plastics material as a separate component. The louvre-shaped inserts are of cylindrical shape and comprise an upper surface and a lower surface that are substantially parallel to each other and are angled downwards from the inside to the outside of the culvert section. Advantageously the upper and lower surfaces are angled at such an angle, and are of a length, so as to substantially overlap when viewed in a horizontal direction. In one embodiment about one half of the length of the respective upper and lower surfaces overlap, measured in a vertical direction. One problem with the culvert sections of U.S. Pat. No. 9,290,964 is that the inserts are relatively expensive to manufacture and install as a separate component, compared to a product in which the apertures are formed integral to the sidewalls of the section.

The present invention was developed with a view to providing an improved liquid run-off disposal system that can be used in any situation without the use of Geosynthetic cloth, and that is particularly applicable where liquid run-off or effluent disposal by infiltration is applied in locations where there is the presence of groundwater.

References to prior art documents in this specification are provided for illustrative purposes only and are not to be taken as an admission that such prior art is part of the common general knowledge in Australia or elsewhere.

SUMMARY OF THE INVENTION

According to one aspect of the present invention there is provided an improved liquid run-off disposal system comprising:

an infiltration chamber having first and second sidewalls, in cross-sectional view the first and second sidewalls each include an inner surface facing an inside of the chamber and outer surface facing an outside of the chamber chamber, and wherein the infiltration chamber is manufactured from a moulded plastics material;

the first and second sidewalls each include a plurality of louvre-shaped apertures provided integrally therein, wherein in cross-sectional view each louvre-shaped aperture includes an upper surface and a lower surface which are substantially planar and angled upwards from the outer surface towards the inside of the chamber; and, the upper and lower surfaces each comprising one or more angled sections, each angled section extending at an angle relative to an adjacent section of the upper and/or lower surfaces respectively and being arranged so as to form a substantially vertical flow path through a portion only of the louvre-shaped aperture resulting in a serpentine flow path through the louvre-shaped aperture the angled sections of the upper and lower surfaces being arranged at an angle and of a length so as to substantially overlap when viewed in a horizontal direction so that the apertures admit the exit of water but substantially inhibit the entry of soil wherein, in use, when liquid run-off is piped into the infiltration chamber it can drain away by passing through the apertures and infiltrating into the surrounding soil.

In one embodiment the portion of the aperture forming a substantially vertical flow path comprises a first substantially vertical angled section of the upper surface. Preferably the first substantially vertical angled section of the upper surface is provided adjacent the outer surface of the sidewall. Preferably a second substantially vertical angled section is provided on the lower surface adjacent the inner surface of the sidewall so as to face the first substantially vertical angled section.

In another embodiment the first substantially vertical angled section of the upper surface is spaced from the outer surface of the sidewall. Typically the first substantially vertical angled section is spaced from the outer surface of the sidewall by a distance of about ⅓ of a total thickness of the side wall. Preferably a second substantially vertical angled section of the lower surface is provided adjacent the inner surface of the sidewall so as to face the first substantially vertical angled section.

In another embodiment a first substantially planar angled section of the lower surface faces a second substantially planar angled section of the upper surface. Preferably the first angled section is substantially longer than the second angled section, and this difference in length corresponds to a gap forming an inner opening of the louver-shaped aperture. Typically this inner opening faces in a generally upwards direction within the infiltration chamber, and corresponds to the portion of the aperture forming a substantially vertical flow path.

Advantageously the portion of the aperture forming a substantially vertical flow path creates a serpentine flow path through the louvre-shaped aperture so that any backflow of groundwater and/or soil held in suspension into an opening of the louvre-shaped aperture at the outer surface must flow substantially vertically upwards, for a distance of "Y", providing a region where gravitational forces acting downwards will inhibit the ingress of soil particles up and through the aperture, inhibiting the soil from entering the chamber.

Preferably the distance "Y" is greater than or equal (≥) to "X", where "X" is an effective height of the opening of the aperture at the outer surface of the sidewall. Preferably the distance "Z" is less than or equal (≤) to "X", where "Z" is an effective height of an opening of the aperture at the inner surface of the sidewall.

Preferably the second vertical angled section of the lower surface is provided on the same wall section of the sidewall as the inner surface of the sidewall, but on the inner face of this wall section. Hence the inner surface of the side wall is provided on the outer face of this wall section. Advantageously, this wall section is also formed with an inwardly curved lip, which further inhibits the ingress of any soil particles through the opening of the aperture at the inner surface, thus further preventing the soil from entering the chamber.

In one embodiment the sidewalls of the infiltration chamber are angled upwards at an angle of between 0° to 30° to the vertical. Typically the sidewalls are angled upwards at an angle of between 5° and 15° to the vertical.

In one embodiment the louvre-shaped apertures are of rectangular shape when viewed facing the sidewalls. Preferably the louvre-shaped apertures are provided in a uniform rectangular array comprising a plurality of rows and columns in the sidewalls.

In another embodiment the louvre-shaped apertures are of trapezoidal shape when viewed facing the outer surface of the sidewall.

Preferably the infiltration chamber is formed with a plurality of reinforcing ribs, each rib extending from one side to the other of the chamber and is integral to, and forms part of, the sidewalls of the chamber. In one embodiment the reinforcing ribs are of parabolic or semi-elliptical shape corresponding to the cross-sectional shape of the infiltration chamber. Advantageously each reinforcing rib is formed with facing sidewalls that are curved inwards, with a maximum spacing at the base and a minimum spacing at the apex of the chamber.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of the improved liquid disposal system, given by way of example only, with reference to the accompanying drawings, in which.

DETAILED DESCRIPTION OF PREFERRED EMBODIMENTS

A first embodiment of the improved liquid run-off disposal system 10 in accordance with the invention, as illustrated in FIGS. 1 to 9, comprises an infiltration chamber 12 having first and second sidewalls 14a and 14b. In cross-sectional view the first and second sidewalls 14 each include an inner surface 16 and outer surface 18 (see FIG. 2). The first and second sidewalls 14 each include a plurality of louvre-shaped apertures 20 provided therein. In cross-sectional view each louvre-shaped aperture 20 includes an upper surface 22 and a lower surface 24 which are substantially parallel to each other and are angled upwards from the outer surface 18 to the inner surface 16.

Figure 2:
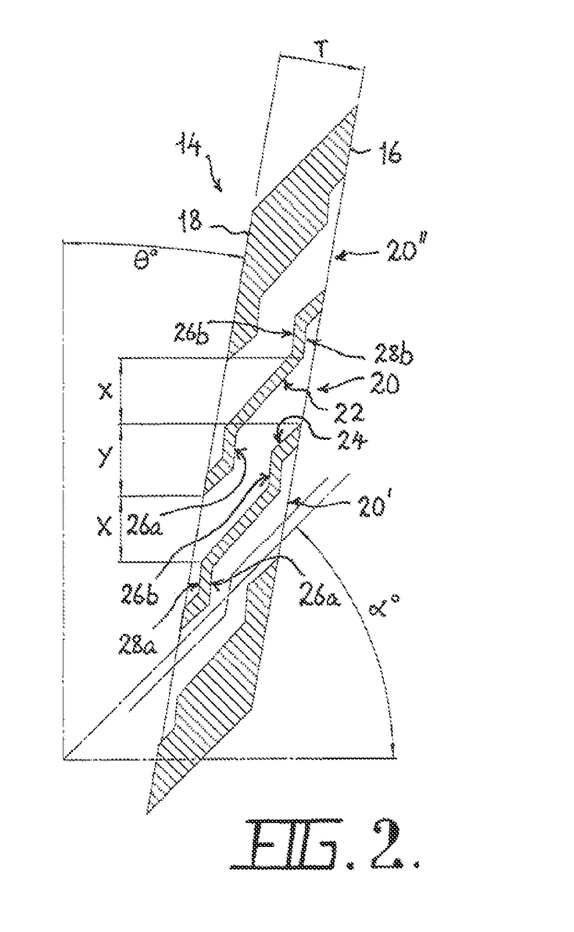
FIG. 2 is a cross-section view of part of the side wall of FIG. 1 through the line A-A.

The upper and lower surfaces 22, 24 each comprise a plurality of angled sections, and the upper surface 22 includes a first substantially vertical section 26a, The angled sections of the upper and lower surfaces 22, 24 are arranged at an angle and of a length so as to substantially overlap when viewed in a horizontal direction, as can be seen most clearly in FIG. 2. The overlapping region is identified as "Y" in FIG. 2. It is this overlap "Y" which ensures that the apertures 20 will admit the exit of water but substantially inhibit the entry of soil wherein, in use, when liquid run-off is piped into the infiltration chamber 10 it can drain away by passing through the apertures 20 and infiltrating into the surrounding soil.

In this embodiment the first substantially vertical angled section 26a of the upper surface 22 is provided adjacent the outer surface 18 of the sidewall 14. Preferably a second substantially vertical angled section 26b of the lower surface 24 is provided adjacent the inner surface 16 of the sidewall 14 so as to face the first substantially vertical angled section 26a. The two substantially vertical angled sections 26 together form a dogleg bend in the cross-sectional shape of the louvre-shaped aperture 20, so as to create a substantially vertical flow path through a portion of the aperture. The portion of the aperture forming a substantially vertical flow path results in a serpentine flow path through the louvre-shaped aperture so that any backflow of groundwater and/or soil into the opening of the louvre-shaped aperture 20 at the outer surface 18 must flow substantially vertically upwards, for a distance of "Y", in order to enter the interior of the chamber 12. Vertical sections 26a and 26b provide a region where gravitational forces acting downwards will inhibit the ingress of soil particles up and through the opening of the aperture 20 on the inner surface 16, preventing the soil from entering the chamber. The vertical sections 26a and 26b will also allow particles of soil large enough to drop back down due to gravitational forces, not allowing those particles to enter the chamber which may have a detrimental effect on the design performance of the chamber and cause silting within the chamber which would reduce the chamber capacity/storage over time.

Figure 1:
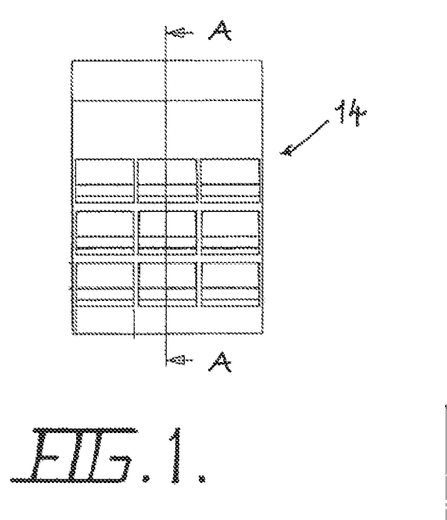
FIG. 1 is a side elevation view of part of a side wall of a first embodiment of the improved liquid run-off disposal system according to the present invention.
Figure 3:
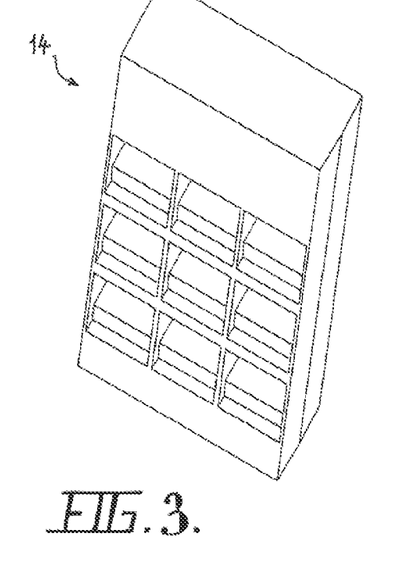
FIG. 3 is a top perspective view of part of the side wall of FIG. 1.
Figure 4:
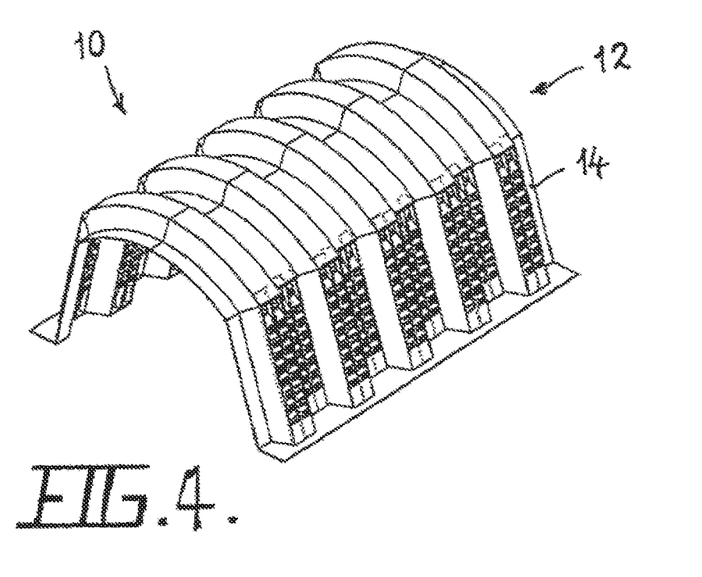
FIG. 4 is a top perspective view of a first embodiment of an infiltration chamber of the improved liquid run-off disposal system according to the present invention, in the form of a culvert section.
Figure 5:
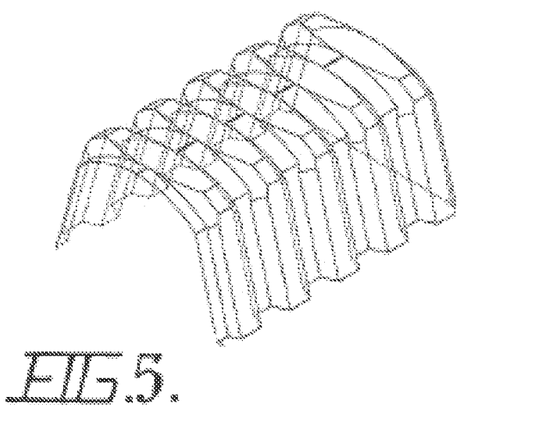
FIG. 5 is a perspective view of the culvert section of FIG. 4.

Preferably the distance "Y" is greater than or equal (≥) to "X", where "X" is the effective height of the opening of the aperture 20 at the outer surface 18 of the sidewall 14. Dimensions "X" and "Y" will vary depending on the wall thickness of the chamber design. As can be seen in FIGS. 1 and 3, in this embodiment louvre-shaped apertures 20 are of rectangular shape when viewed facing the sidewalls. Preferably the louvre-shaped apertures 20 are provided in a uniform rectangular array comprising a plurality of rows and columns in the sidewalls 14. Dimension "T" is the thickness of the sidewall 14.

Dimensions "X" and "Y" can be any shape and any size desired depending on the wall thickness of the chamber design, but must follow the design performance criteria of the chamber 12, i.e. ratios relationships between "X" and "Y" only. If measurement "Y" was to be increased to a minimum of 2×"X" or greater, it would negate the need for vertical wall sections 26a and 26b, i.e. it would allow a straight line louvre to perform in the same manner as if they were not removed.

In one embodiment the sidewalls of the infiltration chamber are angled upwards at an angle θ° of between 0° to 30° to the vertical. Typically the sidewalls are angled upwards at an angle θ° of between 5° and 15° to the vertical. Typically the louvre-shaped apertures 20 are angled at an angle α° of between 20° and 65° to the horizontal. More typically the louvre-shaped apertures 20 are angled at an angle α° of between 35° and 50° to the horizontal. Angles θ° and α° may vary from design to design, depending on the wall thickness of the infiltration chamber 12, so as to maintain the "Y" dimension in line with the above functionality of the chamber design.

Typically for each aperture the distance between the upper surface 22 and the lower surface 24 at the outer surface 18 is the same as the distance between the upper surface 22 and the lower surface 24 at the inner surface 16, i.e. the height "X" of the opening of the louvre-shaped aperture 20 is the same at the inner surface 16 and outer surface 18. In the embodiment illustrated in FIGS. 1 to 3, the opening of the louvre-shaped aperture 20 at both the outer surface 18 and the inner surface 16 has a shallow step 28a and 28b respectively provided adjacent to it. The shallow step 28a at the outer surface 18 is formed on the rear of the first substantially vertical section 26a of an adjacent louvre-shaped aperture 20' (the one below), whilst the shallow step 28b at the inner surface 16 is formed on the rear of the second substantially vertical section 26b of an adjacent louvre-shaped aperture 20" (the one above). This is an artefact of the molding technique used to manufacture the chamber. In fact, the upper surface 22 may continue in one plane from the first substantially vertical section 26a all the way to the inner surface 16 of the sidewall 14. The lower surface 24 may likewise continue in one plane from the second substantially vertical section 26b all the way to the outer surface 18 of the sidewall 14.

A first embodiment of an infiltration chamber 12 of the improved liquid run-off disposal system 10 according to the present invention is illustrated in FIGS. 4 to 9. Typically the liquid run-off disposal system 10 comprises a plurality of the infiltration chambers 12 adapted to be arranged end to end in a substantially horizontal orientation so as to form an elongate tank structure below ground. Each infiltration chamber 12 has a plurality of louvre-shaped apertures 20 provided in the sidewalls 14 thereof wherein, in use, when run-off is piped into the chambers 12 it can drain away by infiltrating the surrounding soil through the apertures 20. In this embodiment each chamber is in the form of an arch-shaped culvert section 12 and is typically open at the base, as can be seen most clearly in FIG. 9.

It can be seen how the culvert sections 12 thus perform a similar function to a prior art soakwell, in that stormwater run-off can infiltrate the surrounding soil through the open base and the apertures 20 in the sidewalls. However, unlike a soakwell, the liquid run-off disposal system 10 is scalable in that any number of the culvert sections 12 can be joined end to end to increase the capacity of the system longitudinally rather than vertically. This scalability also overcomes the requirement of soakwells having to be a minimum of 1800 mm apart to optimise performance, thereby saving space on site. Furthermore the height, length and width of the culvert sections 12 can be varied more readily to suit the application and achieve the required volume capacity.

Preferably each culvert section 12 is of elongate construction and has interlocking edges provided at each end adapted to interlock with an adjoining culvert section 12. Support for the culvert sections will be determined by the Civil Engineer to suit the subterranean soil conditions prior to site installation.

Figure 6:
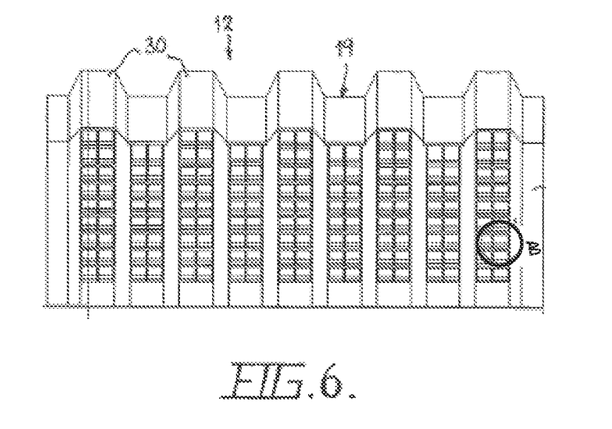
FIG. 6 is a side elevation view of the culvert section of FIG. 4.
Figure 7:
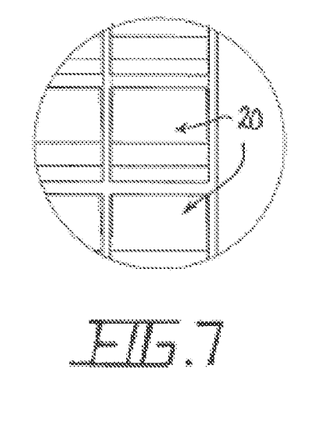
FIG. 7 is an enlargement of detail 'B' in FIG. 6.

Each culvert section 12 of this embodiment has a plurality of rectangular louvre-shaped apertures 20 formed in sidewalls 14 thereof in a uniform array, as can be seen most dearly in FIGS. 6 and 7. Each culvert section 12 of this embodiment typically has an arch cross-sectional shape, as can be seen most clearly in FIG. 9, and has an internal width of approximately 760 mm and an internal height of approximately 490 mm, and is about 1.2 m in length. If the chamber capacity is increased or decreased by design, then these dimensions will vary significantly. The sidewalls 14 are of substantially constant thickness. The culvert section 12 has two substantially planar sidewalls 14 and an arc-shaped roof 19.

Preferably each culvert section 12 is formed with a plurality of reinforcing ribs 30, which extend from one side to the other of the section. The reinforcing ribs 30 are of isosceles trapezoid cross-sectional shape, and are integral to, and form part of, the sidewalls 14 and roof 19 of the culvert section 12. Each reinforcing rib 30 is of similar width to the spacing between the ribs, so that the effect is to create a corrugated cross-section for the sidewalls 14 and roof 19. The reinforcing ribs 30 are also formed with louvre-shaped apertures 20 in the sidewalls 14. The arch-shaped design and corrugated cross-section substantially increases the strength of the culvert section 12 so that it can withstand heavy vehicular traffic and earth loadings without necessarily requiring concrete or other support footings.

Figure 8:
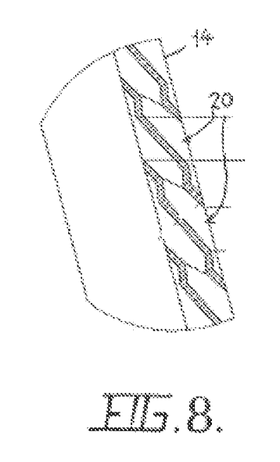
FIG. 8 is an enlargement of detail 'C' in FIG. 9.
Figure 9:
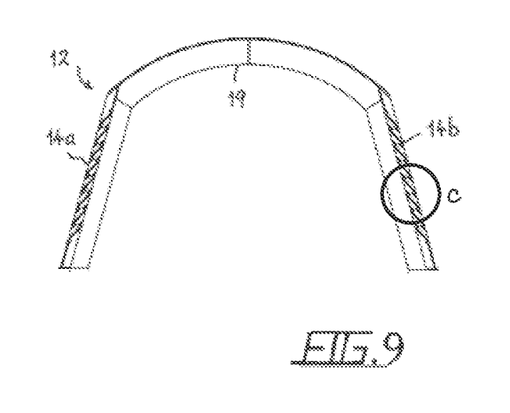
FIG. 9 is a section view along the line A-A through the culvert section of FIG. 6.

The louvre-shaped apertures 20 in the sidewalls 14 are similar to the apertures 20 illustrated in FIGS. 1 to 3, and will not be described again in detail (see detailed enlargements in FIGS. 7 and 8).

Preferably each culvert section 12 has interlocking edges provided at each end and adapted to interlock with an adjoining culvert section 12. A male edge is typically proved at one end, and is designed to interlock with a female edge provided at the other end of each culvert section 12.

The culvert sections 12 are preferably manufactured from either polyethylene (PE) or polypropylene (PP) materials depending on the moulding technique chosen, and may have a greater wall thickness for heavy loads and a reduced wall thickness for lighter loads. Wall thicknesses will vary depending on the size and the end-user application.

The infiltration chamber 12 need not be in the form of a culvert section, but may be of any suitable shape or configuration. It may be open or closed at the bottom and at each or one end. The sidewalls need not be planar, but may be, for example, of parabolic or semi-elliptical shape.

A second embodiment of the improved liquid run-off disposal system in accordance with the invention, as illustrated in FIGS. 10 to 13, comprises an infiltration chamber having first and second sidewalls 44. In this embodiment the sidewalls are of parabolic or semi-elliptical shape, as can be seen most clearly in FIGS. 11 and 12. In cross-sectional view the first and second sidewalls 44 each include an inner surface 46 and outer surface 48 (see FIG. 11). The first and second sidewalls 44 each include a plurality of louvre-shaped apertures 50 provided integrally therein. In cross-sectional view each louvre-shaped aperture 50 includes an upper surface 52 and a lower surface 54 which are substantially parallel to each other and are angled upwards from the outer surface 48 to the inner surface 46.

The upper and lower surfaces 52, 54 each comprise a plurality of angled sections, and the upper surface 52 includes a first substantially vertical angled section 56. The angled sections of the upper and lower surfaces 52, 54 are arranged at an angle and of a length so as to substantially overlap when viewed in a horizontal direction, as can be seen most clearly in FIGS. 11 and 12. The overlapping region is identified as "Y" in FIG. 12. It is this overlap "Y" which ensures that the apertures 50 will admit the exit of water but substantially inhibit the entry of soil wherein, in use, when liquid run-off is piped into the infiltration chamber it can drain away by passing through the apertures 50 and infiltrating into the surrounding soil.

In this embodiment the first substantially vertical angled section 56 of the upper surface 22 is spaced from the outer surface 48 of the sidewall 44. As can be seen most clearly in FIGS. 11 and 12, the vertical section 56 is spaced from the outer surface 48 of the sidewall 44 about ⅓ of the total thickness of the side wall 44. Preferably a second substantially vertical section 58 of the lower surface 44 is provided adjacent the inner surface 46 of the sidewall 44 so as to face the first substantially vertical section 56. The two substantially vertical angled sections 56, 58 together form a dogleg bend in the cross-sectional shape of the louvre-shaped aperture 50, so as to create a substantially vertical flow path through a portion of the aperture. The portion of the aperture forming a substantially vertical flow path results in a serpentine flow path through the louvre-shaped aperture so that any backflow of groundwater and/or soil into the opening of the louvre-shaped aperture 50 at the outer surface 48 must flow substantially vertically upwards, for a distance of "Y", in order to enter the interior of the chamber. Vertical sections 56 and 58 provide a region where gravitational forces acting downwards will inhibit the ingress of soil particles up and through the opening of the aperture 50 on the inner surface 46, preventing the soil from entering the chamber. The vertical sections 56 and 58 will also allow particles of soil large enough to drop back down due to gravitational forces, not allowing those particles to enter the chamber which may have a detrimental effect on the design performance of the chamber and cause silting within the chamber which would reduce the chamber capacity/storage over time.

In the embodiment illustrated in FIGS. 10 to 13, the second vertical section 58 of the lower surface 54 is provided on the same wall section of the sidewall 44 as the inner surface 46 of the sidewall 44, but on the inner face of this wall section. The inner surface 46 of the side wall 44 is provided on the outer face of this wall section. Advantageously, this wall section is also formed with an inwardly curved lip 60, which further inhibits the ingress of any soil particles through the opening of the aperture 50 on the inner surface 46, thus further preventing the soil from entering the chamber.

Figure 12:
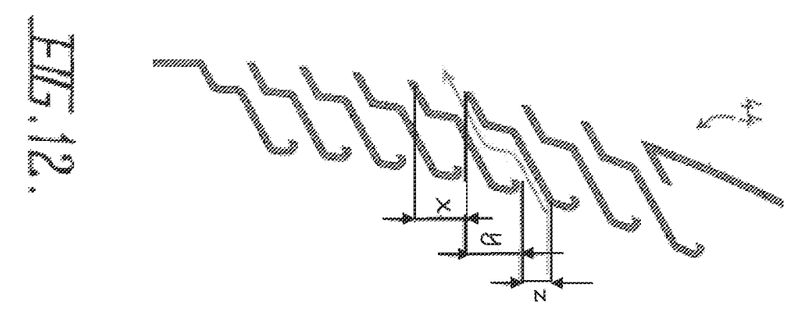
FIG. 12 is a partial cross-section view of part of the side wall of FIG. 10 through the line A-A.

Preferably the distance "Y" is greater than or equal (≥) to "X", where "X" is the effective height of the opening of the aperture 50 at the outer surface 48 of the sidewall 44 (see FIG. 12). Dimensions "X" and "y" will vary depending on the wall thickness of the chamber design. Dimension "Z" is the effective height of the opening of the aperture 50 at the inner surface 46 of the sidewall 44. In this embodiment, dimension "Z" is approximately half the size of dimension "X". Dimensions "X", "Y" and "Z" can be any shape and any size desired depending on the wall thickness of the chamber design, but must follow the design performance criteria of the chamber, i.e. ratios relationships between "X" and "Y" only.

In this embodiment dimension "X" is typically between mm to 70 mm, and dimension "Y" is typically between 50 mm to 80 mm. More typically dimension "X" is between 50 mm to 60 mm, and dimension "Y" is between mm to 70 mm. In the illustrated embodiment dimension "X" is about 58.1 mm, and dimension "Y" is about 65.8 mm. Dimension Z may vary significantly depending on how high the wall section with inwardly curved lip 60 is designed to be, so as to permit sufficient outflow of liquid runoff from within the infiltration chamber. In the illustrated embodiment dimension "Z" is about 33.9 mm.

Figure 10:
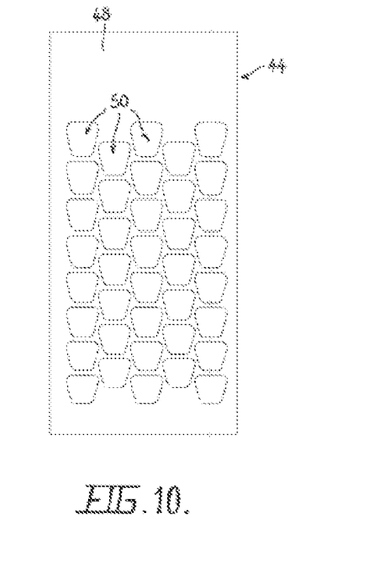
FIG. 10 is a side elevation view of part of a side wall of a second embodiment of the improved liquid run-off disposal system according to the present invention.
Figure 11:
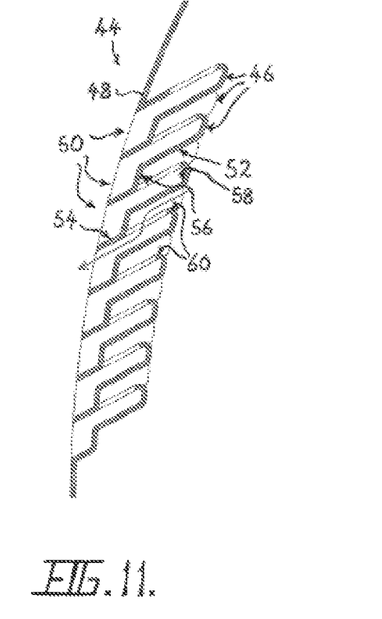
FIG. 11 is a full cross-section view of part of the side wall of FIG. 10 through the line A-A.
Figure 13:
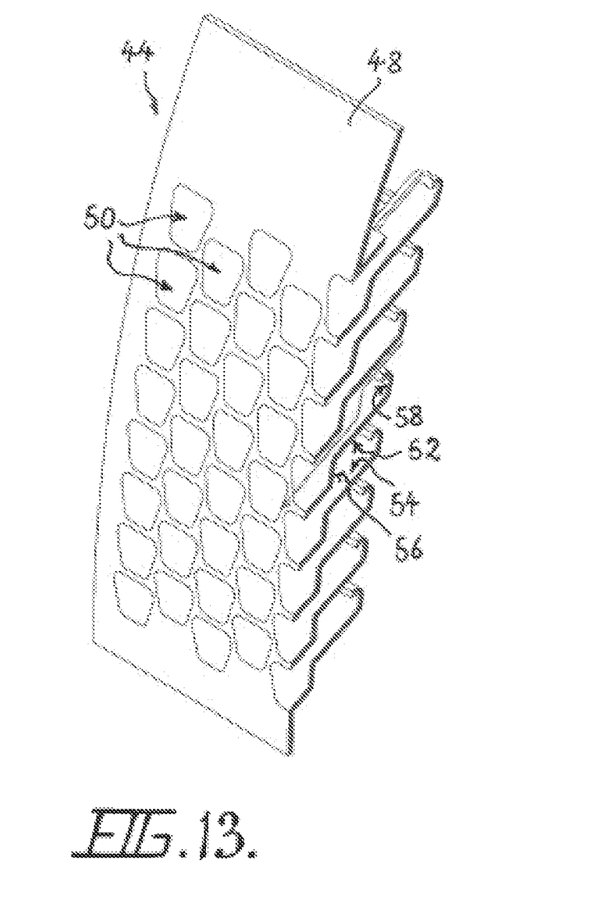
FIG. 13 is a perspective view of part of the side wall of FIG. 10, showing a section through the line A-A.

As can be seen in FIGS. 10 and 13, in this embodiment louvre-shaped apertures 50 are of trapezoidal shape, with rounded vertices, when viewed facing the outer surface 46 of sidewall 44. Preferably the louvre-shaped apertures 50 are provided in a uniform array comprising a plurality of columns of apertures in the sidewalls 44. Typically each column of apertures 50 is offset vertically relative to its adjacent column.

A second embodiment of an infiltration chamber 72 of the improved liquid run-off disposal system 70 according to the present invention is illustrated in FIGS. 14 to 19. Typically the liquid run-off disposal system 70 comprises a plurality of the infiltration chambers 72 adapted to be arranged end to end in a substantially horizontal orientation so as to form an elongate tank structure below ground. Each infiltration chamber 72 has a plurality of louvre-shaped apertures 80 provided in sidewalls 74 thereof wherein, in use, when run-off is piped into the chambers 72 it can drain away by infiltrating the surrounding soil through the apertures 80. In this embodiment also each chamber is in the form of an arch-shaped culvert section 72 and is typically open at the base, as can be seen most clearly in FIG. 14.

Figure 14:
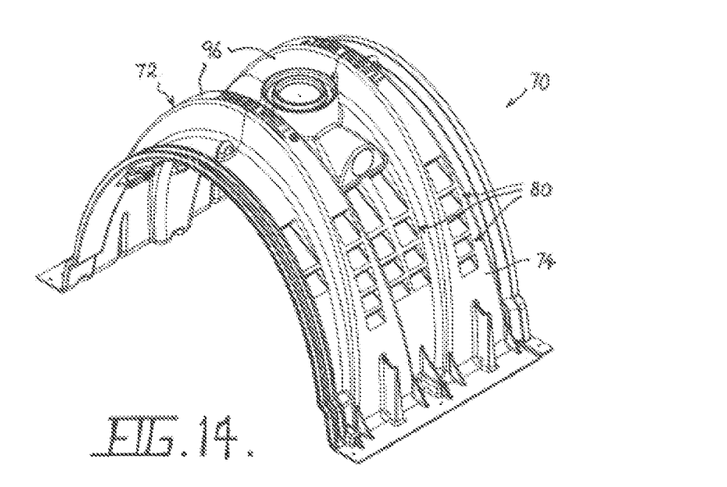
FIG. 14 is a top perspective view of a second embodiment of an infiltration chamber of the improved liquid run-off disposal system according to the present invention, in the form of a culvert section.
Figure 15:
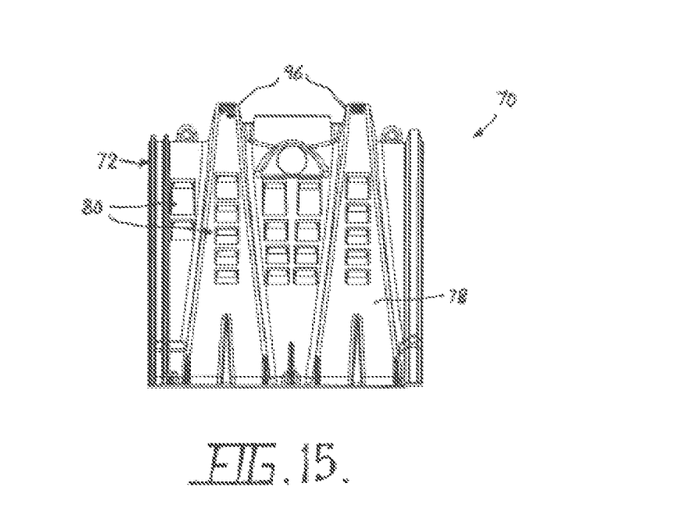
FIG. 15 is a side elevation view of the culvert section of FIG. 14.
Figure 16:
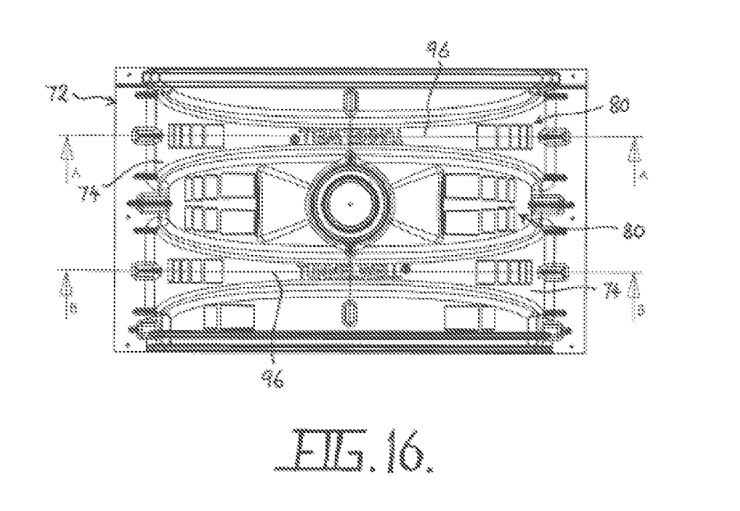
FIG. 16 is a top plan view of the culvert section of FIG. 14.

Each culvert section 72 of this embodiment has a plurality of rectangular louvre-shaped apertures 80 formed integrally in sidewalls 74 thereof in a uniform array, as can be seen most clearly in FIGS. 14 and 15. In this embodiment each culvert section 72 typically has an arch cross-sectional shape, as can be seen most clearly in FIGS. 14 and 17, and has an internal width of approximately 1330 mm and an internal height of approximately 930 mm, and is about 1.05 m in length. The illustrated culvert section 72 has an external height of approximately 1090 mm. If the chamber capacity is increased or decreased by design, then these dimensions will vary significantly. The sidewalls 74 are of substantially constant thickness. The infiltration chamber 72 of this embodiment has sidewalls 74 of parabolic or semi-elliptical shape, as can be seen most clearly in FIG. 17.

Preferably each infiltration chamber 72 is formed with a plurality of reinforcing ribs 96, which extend from one side to the other of the chamber. The reinforcing ribs 96 are of isosceles trapezoid cross-sectional shape, and are integral to, and form part of, the sidewalls 74 of the culvert section 72. As such, the reinforcing ribs 96 are also of parabolic or semi-elliptical shape, as can be seen most clearly in FIG. 17. Each reinforcing rib 96 is also formed with facing sidewalls that are curved inwards forming a maximum spacing at the base to a minimum spacing at the apex of the chamber 72. The reinforcing ribs 96 are also formed with louvre-shaped apertures 80 in the sidewalls 74. The arch-shaped design and the curvature of the sidewalls of the ribs 96 substantially increases the load-bearing capacity and the strength of the culvert section 72 so that it can withstand heavy vehicular traffic and earth loadings without necessarily requiring concrete or other support footings.

Preferably each culvert section 72 has interlocking edges provided at each end and adapted to interlock with an adjoining culvert section 72. A male edge is typically proved at one end, and is designed to interlock with a female edge provided at the other end of each culvert section 72. In other respects the culvert section 72 is similar to the culvert section 12, illustrated in FIGS. 5 to 9, and will not be described again in detail.

Figure 17:
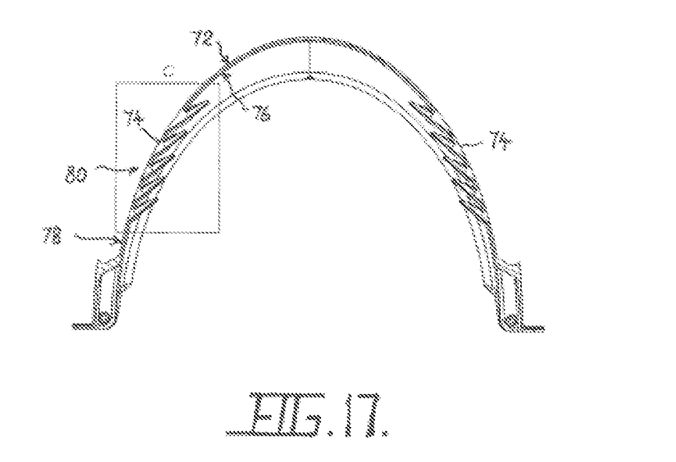
FIG. 17 is a section view along the line A-A through the culvert section of FIG. 16.
Figure 18:
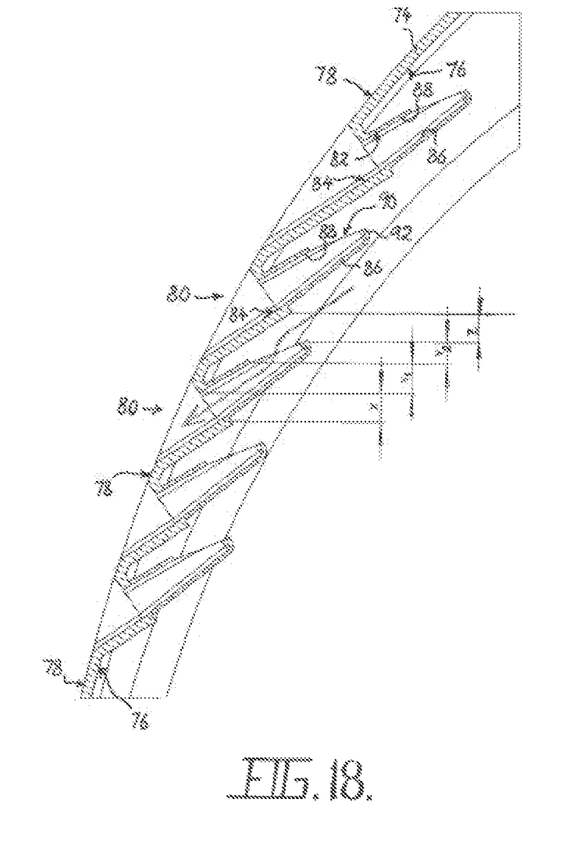
FIG. 18 is an enlargement of detail 'C' in FIG. 17, shown in full section view; and, FIG. 19 is an enlargement of detail 'C' in FIG. 17, shown in partial section view.

In cross-sectional view the first and second sidewalls 74 each include an inner surface 76 and outer surface 78 (see FIGS. 17 and 18). In cross-sectional view each louvre-shaped aperture 80 includes an upper surface 82 and a lower surface 84 which are substantially parallel to each other and are angled upwards from the outer surface 78 and protrude inwards from the inner surface 76 into the interior of the infiltration chamber 72. The upper and lower surfaces 82, 84 comprise a plurality of angled sections, the angled sections being arranged so as to form a substantially vertical flow path through a portion of the aperture. The angled sections of the upper and lower surfaces 82, 84 are arranged at an angle and of a length so as to substantially overlap when viewed in a horizontal direction, as can be seen most clearly in FIGS. 18 and 19. The overlapping region is identified as "$Y_1$" in FIGS. 18 and 19. It is this overlap "$Y_1$" which ensures that the apertures 80 will admit the exit of water but substantially inhibit the entry of soil wherein, in use, when liquid run-off is piped into the infiltration chamber it can drain away by passing through the apertures 80 and infiltrating into the surrounding soil.

In this embodiment a first substantially planar angled section 86 of the lower surface 84 faces a second substantially planar angled section 88 of the upper surface 82. As can be seen most clearly in FIGS. 18 and 19, the first angled section 86 is about twice as long as the second angled section 88, and this difference in length is identified as "$Y_2$" in FIGS. 18 and 19. "$Y_2$" corresponds to a gap forming an inner opening 90 of the aperture 80, and this opening 90 faces in a generally upwards direction within the infiltration chamber 72. In this embodiment, the distance "$Y_2$" also corresponds to the portion of the aperture 80 forming a substantially vertical flow path. This results in a serpentine flow path through the louvre-shaped aperture 80, as indicated by the arrow in FIGS. 18 and 19. The serpentine flow path means that any backflow of groundwater and/or soil held in suspension into an opening of the louvre-shaped aperture 80 at the outer surface 78 must flow substantially vertically upwards, for a distance of "$Y_2$", in order to enter the interior of the chamber 72. This provides a region where gravitational forces acting downwards will inhibit the ingress of soil particles up and through the opening 90 of the aperture 80, preventing the soil from entering the chamber 72. The portion of the aperture 80 forming a substantially vertical flow path will allow particles of soil large enough to drop back down due to gravitational forces, inhibiting those particles from entering the chamber, which may have a detrimental effect on the design performance of the chamber by causing silting which would reduce the chamber capacity/storage over time.

Figure 19:
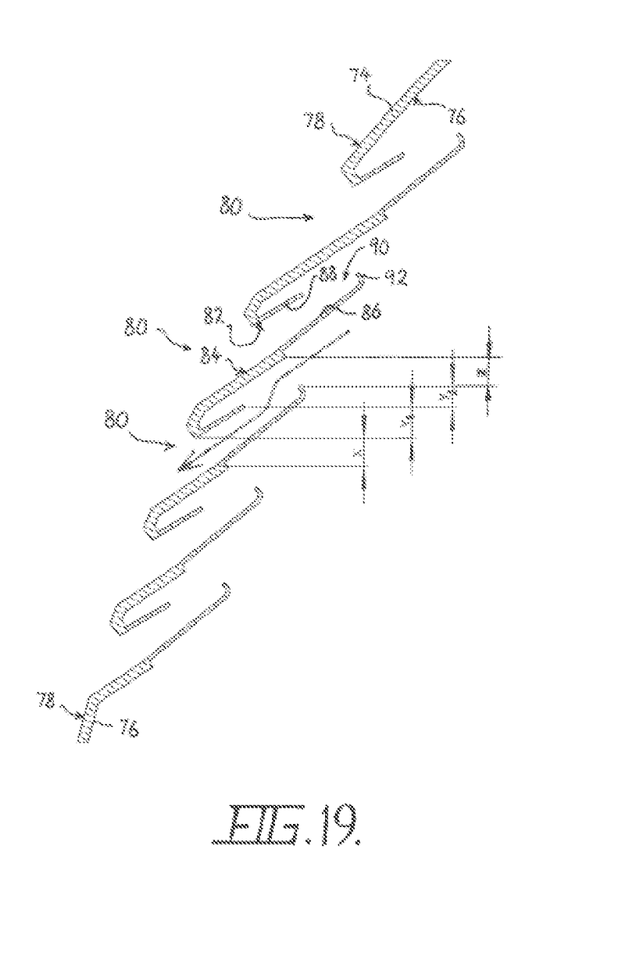

Advantageously, the first angled section 86 is also formed with an inwardly curved lip 92, which further inhibits the ingress of any soil particles through the inner opening 90 of the aperture 80, thus further preventing the soil from entering the chamber 72.

Preferably the distance "Y" (="$Y_1$"+"$Y_1$") is greater than or equal ($\geq$) to "X", where "X" is the effective height of the opening of the aperture 80 at the outer surface 78 of the sidewall 74 (see FIGS. 18 and 19). Dimensions "X" and "Y" will vary depending on the wall thickness of the chamber design. Dimension "Z" is the effective height of the opening between aperture 80 and its upper adjacent aperture 80, protruding inwards from the inner surface 76 of the sidewall 74. In this embodiment, dimension "Z" is approximately the same size as dimension "X". Dimensions "X", "Y" and "Z" can be any shape and any size desired depending on the angle of inclination of the louvre-shaped apertures 80 and the curvature of the wall 74 of the chamber, but must follow the design performance criteria of the chamber, i.e. ratios relationships between "X" and "Y" only.

In this embodiment dimension "X" is typically between 15 mm to 35 mm, and dimension "$Y_1$" is typically between 15 mm to 35 mm. More typically dimension "X" is between 20 mm to 30 mm, and dimension "$Y_2$" is between 20 mm to 30 mm. In the illustrated embodiment dimension "X" is about 23 mm, and dimension "$Y_1$" is about 25 mm. Dimension Z may vary significantly depending on how long the angled section 86 with inwardly curved lip 92 is designed to be, so as to permit sufficient outflow of liquid runoff from within the infiltration chamber. In the illustrated embodiment dimension "Z" is about 23 mm.

As can be seen in FIGS. 14 and 15, in this embodiment louvre-shaped apertures 80 are of rectangular shape, when viewed facing the outer surface 76 of sidewall 74. Preferably the louvre-shaped apertures 80 are provided in a uniform array comprising a plurality of columns of apertures in the sidewalls 84. In this embodiment each column of apertures 80 is vertically aligned with an adjacent column.

It will be understood that each of the above-described embodiments the infiltration chambers can be manufactured from any suitably rigid and strong material, including suitable plastics products such as HDPE, polypropylene, polyethylene, polyurethane filament additives and thermoplastics. Other suitable materials include various synthetic compounds, polymers, petrochemical derivatives, and fibreglass compounds. Advantageously the infiltration chambers with integral louvre-shaped apertures are manufactured using a moulding technique, for example, injection moulding or rotational moulding (roto-moulding).

Now that preferred embodiments of the improved liquid run-off disposal system have been described in detail, it will be apparent that it provides a number of advantages over the prior art, including the following:

(i) Each of the embodiments is fully scalable in that the number of sections as well as the shape, height, length and width of the sections can be varied to suit the application.

(ii) The scalability of the system can provide for greater land use by developers and local councils as it can do away with age old system designs such as compensating basins in subdivisions.

(iii) The louvre-shaped apertures, in particular their downward angle together with the overlapping surfaces and vertical section(s), obviate the need for the use of Geosynthetic cloth to prevent the ingress of most soil types, even in locations with high groundwater levels and substantiality extend the life of infiltration into the soils.

(iv) The culvert sections are simple and easy to install, compared to prior art soakwells to achieve equivalent volumetric capacities.

(v) The excavated material from the installation of the present system is easily quantifiable for reuse by earthmovers.

(vi) The sections may be readily mass-produced from various materials, thus reducing manufacturing costs.

It will be readily apparent to persons skilled in the relevant arts that various modifications and improvements may be made to the foregoing embodiments, in addition to those already described, without departing from the basic inventive concepts of the present invention. For example, in the illustrated embodiments the louvre-shaped apertures are of rectangular shape or trapezoid shape. However the apertures may be of any suitable shape, for example, circular or oval-shaped. Therefore, it will be appreciated that the scope of the invention is not limited to the specific embodiments described.

The invention claimed is:

1. An improved liquid run-off disposal system comprising:

an infiltration chamber having first and second sidewalls, in cross-sectional view the first and second sidewalls each include an inner surface facing an inside of the chamber and outer surface facing an outside of the chamber, and wherein the infiltration chamber is manufactured from a moulded plastics material;

the first and second sidewalls each include a plurality of louvre-shaped apertures provided integrally therein, wherein in cross-sectional view each louvre-shaped aperture includes an upper surface and a lower surface which are angled upwards from the outer surface towards the inside of the chamber; and the upper and lower surfaces each comprising a plurality of substantially planar angled sections, each angled section extending at an angle relative to an adjacent section of the upper and/or lower surfaces respectively, and comprising a first angled section angled upwards relative to the outer surface of the chamber on the upper surface of the louvre-shaped aperture and a second angled section angled upwards relative to the outer surface of the chamber on the lower surface of the louvre-shaped aperture, a first substantially vertical angled section adjacent to the first angled section and extending substantially vertically on the upper surface of the louvre-shaped aperture and a second substantially vertical angled section adjacent to the second angled section and extending substantially vertically on the lower surface of the louvre-shaped aperture, the first and second substantially vertical angled sections being arranged so as to form a substantially vertical flow path through a portion only of the louvre-shaped aperture, and a third angled section angled upwards, adjacent to the first substantially vertical angled section, on the upper surface of the louvre-shaped aperture and a fourth angled section angled upwards, adjacent to the first substantially vertical angled section, on the lower surface of the louvre-shaped aperture resulting in a serpentine flow path through the louvre-shaped aperture between the inner surface and the outer surface of the chamber, at least the first and second substantially vertical angled sections of the upper and lower surfaces respectively facing each other and being substantially parallel and arranged at an angle and of a length so as to substantially overlap when viewed in a horizontal direction so that the apertures admit the exit of water but substantially inhibit the entry of soil wherein, in use, when liquid run-off is piped into the infiltration chamber it can drain away by passing through the apertures and infiltrating into the surrounding soil.

2. An improved liquid run-off disposal system as defined in claim 1, wherein the first substantially vertical angled section of the upper surface is provided adjacent the outer surface of the sidewall.

3. An improved liquid run-off disposal system as defined in claim 2, wherein the second substantially vertical angled section is provided on the lower surface adjacent the inner surface of the sidewall so as to face the first substantially vertical angled section.

4. An improved liquid run-off disposal system as defined in claim 1, wherein the first substantially vertical angled section is spaced from the outer surface of the sidewall.

5. An improved liquid run-off disposal system as defined in claim 4, wherein the first substantially vertical angled section is spaced from the outer surface of the sidewall by a distance of about ⅓ of a total thickness of the side wall.

6. The improved liquid run-off disposal system as defined in claim 1, wherein the first angled section of the upper surface faces the second angled section of the lower surface.

7. The improved liquid run-off disposal system as defined in claim 1, wherein the portion of the aperture forming a substantially vertical flow path creates a serpentine flow path through the louvre-shaped aperture so that any backflow of groundwater and/or soil held in suspension into an opening of the louvre-shaped aperture at the outer surface must flow substantially vertically upwards, for a distance of "Y", providing a region where gravitational forces acting downwards will inhibit the ingress of soil particles up and through the aperture, inhibiting the soil from entering the chamber.

8. The improved liquid run-off disposal system as defined in claim 7, wherein the distance "Y" is greater than or equal (≥) to "X", where "X" is an effective height of the opening of the aperture at the outer surface of the sidewall.

9. The improved liquid run-off disposal system as defined in claim 8, wherein a distance "Z" is less than or equal (≤) to "X", where "Z" is an effective height of an opening of the aperture at the inner surface of the sidewall.

10. The improved liquid run-off disposal system as defined in claim 1, wherein the sidewalls of the infiltration chamber are angled upwards at an angle of between 0° to 30° to the vertical.

11. The improved liquid run-off disposal system as defined in claim 10, wherein the sidewalls are angled upwards at an angle of between 5° and 15° to the vertical.

12. The improved liquid run-off disposal system as defined in claim 1, wherein the louvre-shaped apertures are of rectangular shape when viewed facing the sidewalls.

13. The improved liquid run-off disposal system as defined in claim 12, wherein the louvre-shaped apertures are provided in a uniform rectangular array comprising a plurality of rows and columns in the sidewalls.

14. The improved liquid run-off disposal system as defined in claim 1, wherein the louvre-shaped apertures are of trapezoidal shape when viewed facing the outer surface of the sidewall.

15. The improved liquid run-off disposal system as defined in claim 1, wherein the infiltration chamber is formed with a plurality of reinforcing ribs, each rib extending from one side to the other of the chamber and is integral to, and forms part of, the sidewalls of the chamber.

16. The improved liquid run-off disposal system as defined in claim 15, wherein each reinforcing rib is also integral to, and forms part of, a roof of the chamber.

17. The improved liquid run-off disposal system as defined in claim 16, wherein each reinforcing rib is formed with facing sidewalls that are curved inwards, with a maximum spacing at a base of the chamber and a minimum spacing at the roof of the chamber.

* * * * *